(12) United States Patent
Iseli

(10) Patent No.: US 6,745,644 B1
(45) Date of Patent: Jun. 8, 2004

(54) METHOD FOR GUIDING AN ENDLESS BAND-SAW BLADE

(75) Inventor: Benno Iseli, Schötz (CH)

(73) Assignee: Iseli & Co. AG Maschinenfabrik, Schotz (CH)

( * ) Notice: Subject to any disclaimer, the term of this patent is extended or adjusted under 35 U.S.C. 154(b) by 0 days.

(21) Appl. No.: 10/018,915

(22) Filed: Dec. 18, 2001

(30) Foreign Application Priority Data

Jun. 18, 1999 (CH) ............................................. 1138/99

(51) Int. Cl.⁷ .............................................. B23D 63/18
(52) U.S. Cl. .............................................. 76/27; 76/112
(58) Field of Search ........................ 76/25.1, 27, 50.2, 76/74, 75, 112

(56) References Cited

U.S. PATENT DOCUMENTS

| | | | | |
|---|---|---|---|---|
| 932,987 A | * | 8/1909 | Hibbert ......................... | 76/27 |
| 971,841 A | * | 10/1910 | Hibbert et al. .................. | 76/27 |
| 3,919,900 A | * | 11/1975 | Allen et al. ..................... | 76/27 |
| 5,488,884 A | | 2/1996 | Andrianoff et al. ............ | 76/41 |

FOREIGN PATENT DOCUMENTS

| | | |
|---|---|---|
| DE | 3313 160 C1 | 7/1984 |
| DE | 4214 784 A1 | 11/1992 |
| EP | 0 820 829 A1 | 7/1996 |
| FR | 1.237.060 | 10/1959 |
| SU | 738874 | 5/1980 |

\* cited by examiner

Primary Examiner—Hwei-Siu Payer
(74) Attorney, Agent, or Firm—Fredrikson & Byron, P.A.

(57) ABSTRACT

In installations for truing up band blades, band-saw blades must be precisely measured, in order to be trued up accurately. The band-saw blade to be trued runs over two deviation stations and is trued up in the upper linear guide area. The invention provides a saw-band guide section in order to measure the pre-tension in the saw blade which creates the desired bowing. The saw-band guide section is formed by two parallel guide bearers, each of which is subdivided into two sub-bearer sections. The band-saw blade is guided on bearing rollers between the guide bearers and guided by dead rolls which are mounted on pivoting carriages into a curve which corresponds to a clothoid arc. A measurement carried out by a measuring bar comprising sensors provides an extremely accurate, constant result in an area practically devoid of stress.

10 Claims, 3 Drawing Sheets

METHOD FOR GUIDING AN ENDLESS BAND-SAW BLADE

Figure 1:
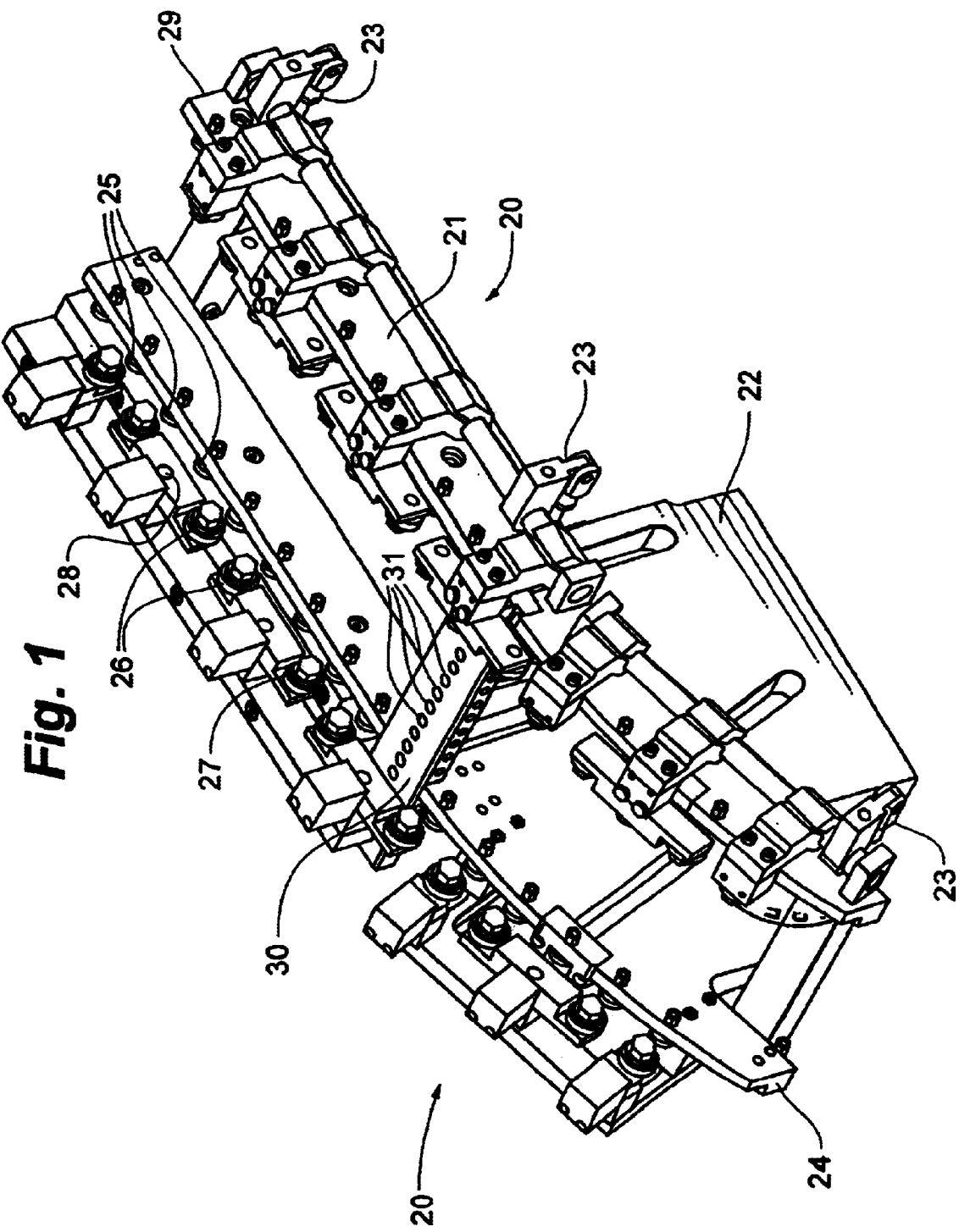

The present invention relates to a device for guiding an endless band-saw blade around two deflection stations arranged at a distance to one another, with which the band-saw blade in each case is guided with a constant radius and at least one straight-lined path arranged therebetween.

The invention relates also to a device for measuring and setting the tension of a band-saw blade, with which this is guided according to the method. Furthermore the invention includes a band-saw machine with which the band-saw blade is guided.

As is known band-saw blades with their use are to remove material where possible. This means that the band-saw blades in their straight path course between the two deflection stations are to be absolutely flat. Furthermore a band-saw blade is to be guided in the deflection stations at an equal as possible location. If the band-saw blade in the guiding region of the deflection stations is only arcuate in the direction of the course of the deflection stations, i.e. running practically on a semi-circle, then the drums, rollers or deflection wheels must be practically cylindrical. On a cylindrical surface the band-saw blade would however have an insufficient guiding and would run off course. Accordingly one has provided these deflection rollers, drums or wheels with slightly cambered surfaces. The band saw blades must as a result on the staright paths run completely level whilst in the curvature of the deflection station should have a cambered shape. This is to be achieved in that by way of pressure rollers a tension is pressed into the so-called body of the band-saw blade which leads to the fact that the blade in the arcuate region assumes a curved shape.

This rolling-in of tension in the band-saw blade is an extremely akward activity which entails much experience. The correct setting of this pre-tension has an essential influence on the problem-free operation in a sawing mill, on the output which may be achieved, and above all on the life expectancy of the band-saw blade. By way of the pressure rollers however not only is the tension in the band-saw blade set but also simultaneously its shape is determined. Thus possibly present unevenesses may be corrected by way of the pressure rollers and likewise the exact straight running of the rear edge of the band-saw blade.

Until today it is common for the man skilled in the art who carries out this work to lift the free, non-tensioned band-saw blade and to fix and mark in the meniscus region by way of a ruler or by way of a template the cambering of the band-saw blade, at which location possible corrections are carried out. This is essentially work carried out by hand whilst subsequently by way of a simple machine with pressure rollers the tensions are pressed into the band-saw blade.

From the European patent application EP-A-0 820 829 (Walter Oppliger, Uetendorf) there is known a device with which the band-saw blade may not only be pre-tensioned by way of suitable pressure rollers but with which additionally the pre-tension in an arcuate course of the band-saw blade may be measured. With this device one imitates the principle of the procedure made by hand. With this the band-saw blade with respect to a rest is guided upwards and from this higher region in a free curve is again led back onto the rest. The meaurement here is effected in the descending region, by which means the desired curvature is not exactly measured but the inverse cambering. Attempts by the applicant have now shown that this measurement yields unreliable results. The reason for this is the free running of the band-saw blade which is not controlled, wherein the still present residual tensions in the blade changes the course of the curve and as a result also co-influences the cambering itself.

On the market there is further obtainable a device for measuring and forming the tension in a band-saw blade similar to the mentioned device according to EP-A-0 820 829. Here the measurement is done shortly before the transition into the straight-lined path, still in the region of the constant radius. An imitation of this measuring path by the applicant likewise showed inaccurate and varying results. In order to achieve results which are as constant as possible the band-saw blade in this machine marketed by the company Ishida Trading Co. Ltd. the band-saw blade must have a sufficient tensile stress. In order to obtain as constant as possible results the band-saw blade in the measuring region must be guided as uniformly as possible by way of holding-down devices. This however results in a constraint which is in conflict with the desired impressed tensions and leads to falsifying results.

By way of very costly trials the applicant has finally found a solution which leads to extremely exactly repeatable measuring results. Assuming that one knows that the band-saw blade in the straight-lined path course is to be absolutely level and in the arcuate region is to have a cambering inasmuch as this is concerned one may assume that the band-saw blade in the transition region practically thus on a line assumes a discontinuous change in shape. This discontinuous change however leads to the undesired irregularities with the measurements. It was therefore the object of the present invention to provide a method with which the discontinuous change in tension in the band-saw blade may be avoided.

As a particularly suitable shape of a path region with an increasing radius has shown to be the shape of a clothoid arc.

The guiding of the band-saw blade according to the method resulted in the possibility of realising a device for measuring and setting the tension of a band-saw blade which permits exact measurements in a manner such that one may construct a device by way of which the band-saw blades may now be correctly shaped.

From the consideration that evidently the guiding according to the invention of a band-saw blade avoids the discontinuous change of the geometry of the band-saw blade one has come to the conclusion that the tension change which has been discontinuous up to now may also be responsible for the fracture formation in the band-saw blade.

Figure 2:
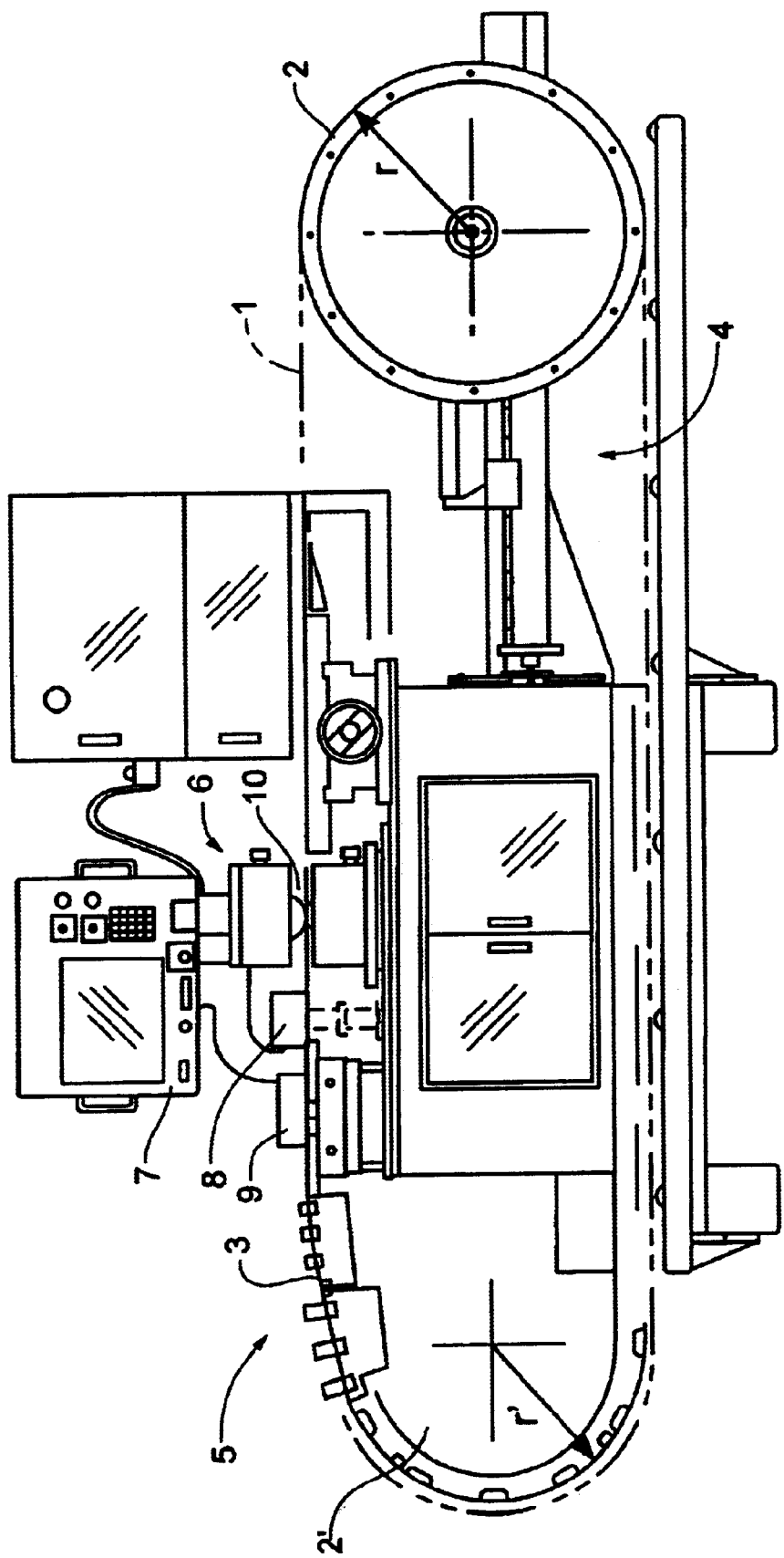
Figure 3:
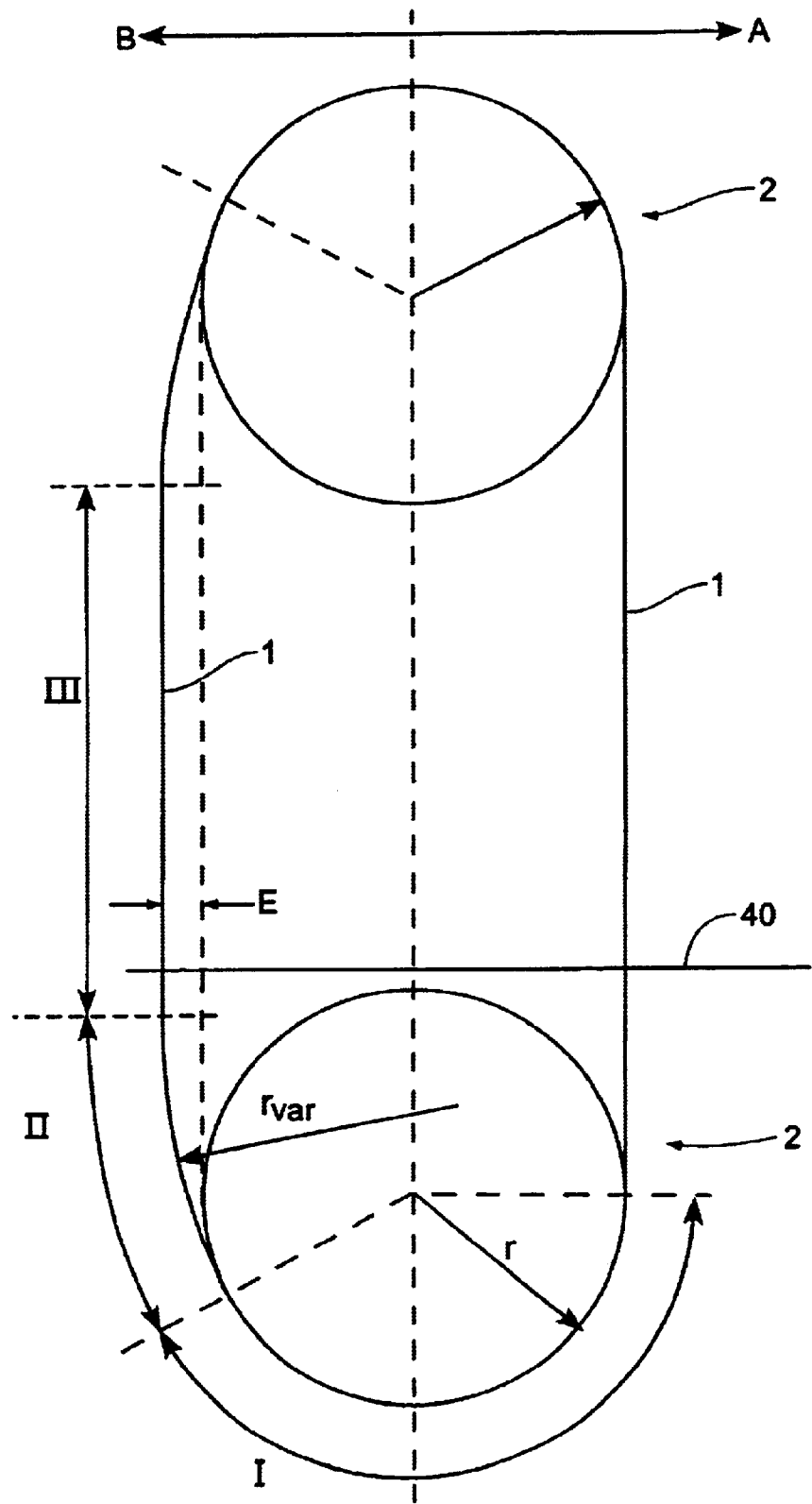

In the acompanying drawings there is shown one embodiment form of the saw-blade guiding in detail and the application according to the invention is shown schematically. There are shown in:

FIG. 1 a perspective representation of a path region in which the band-saw blade is guided with an increasing radius;

FIG. 2 shows in a simplified representation a device for measuring and tensioning a band-saw blade and FIG. 3 is a purely schematic representation of a band-saw machine with the features of the invention.

The method according to the invention is to be explained most clearly by way of FIG. 3. The band-saw blade itself is indicated with the reference numeral 1. At a distance to one another there are shown two deviation stations 2. In the case of a band-saw machine the deviation stations 2 are formed by suitable wheels. In other applications, for example in the application of a device for measuring and setting the tension of a band-saw blade the deviation station may also be formed by a multitude of rollers or drums which also define an at least circular path.

The FIG. 3 which symbolically shows the arrangement of a band-saw machine is configured such that in the right half on side A one can see the conventional guiding of a band-saw blade whilst in the left picture half B the guiding according to the invention of the band-saw blade is shown.

In the conventional guiding of a band-saw blade this runs at the deviation stations 2 along a half the circumference of the deviation wheels. In the region between the two deviation stations 2 the band-saw blade runs straight along a line which forms the common tangent to the two deviation wheels.

In contrast to this in the left picture half the blade guiding is different. Here there are not only recognisable two various blade course direction sections, but three. The section I represents that section in which the band-saw blade runs around the deviation wheel of the deviation station 2. In this region the circle of the course is arc-shaped, i.e. the radius in this region is constant. Following this region is a second region II according to the invention in which the band-saw blade runs in a curve with a continuously increasing radius $R_{var}$. In this section the band-saw blade preferably runs in the shape of a clothoid arc. Finally there remains yet a section III in which the band-saw blade runs completely straightly. In this region with this embodiment form however the straight line laid through this path II does not form the common tangent to the curves with a constant radius, or to the two wheels of the deviation stations 2 but is displaced parallel thereto. This distance of the parallel displacement is often called eccentricity and in most mathematical formulae is indicated with an E. Here in this context one does not need to go into exact detail of a cloithoid arc since this is dealt with sufficiently in mathematical literature and is available to everyone. Accordingly the origin of the corresponding integral is not gone into.

In FIG. 3 simplified symbolically the line 40 represents the level of the table of the band-saw machine. The free usable space for leading through the material to be sawn is thus not compromised by the guiding of the band-saw according to the invention.

The actual design of the clothoid arc or of the region in which the band-saw blade is guided such that one radius continuously increases is recognised most clearly in FIG. 1. The band-saw blade itself in this Figure has been half left out for clarity. The band-saw blade guiding section II shown here is formed according to a clothoid arc. It consists of two parallel guide cheeks 20 which in each case for reasons of manufacturing technology are subdivided into two part cheek sections 21 and 22. The distance of both part cheek sections to one another may be set according to the width of the band-saw blades. The suitable adjusting machanisms are indicated at 23. In the region of the first part cheek section 21 the clothoid arc is only provided with a very low curvature. Only the second part cheek section 22 has a greater curvature and at the end 24 the curvature of the path practically blends into the radius of the deviation station.

On both sides the band-saw blade in the region of both cheeks on the one hand are guided on bearing rollers 25 and on the other hand are guided from above via holding-down rollers 26. In order to force the band-saw blade into a predetermined shape without too much force, in each case two holding-down rollers 26 are mounted in a pivoting carriage 27 which permits a certain tilting movement about an axis 28. Thus it is ensured that the band-saw blade may be guided in the shape of a clothoid arc practically without great external influence.

In this region the band-saw blade is conveyed continuously from a cambered shape into a flat guiding. Where exactly between that end which connects 24 to the region with the constant radius and that end 29 which connects to the straight path region the band-saw blade is practically without tension and as a result the most accurate information is obtainable, may be deduced exactly by way of experiment. In the embodiment example shown here this region is achieved between the part cheek sections 21 and 22. Also when the actual external tension free region is shortly before or after this, the measurment yields an extremely reliable repreatable result as trials have shown.

The measuring station 3 by way of which the tension-related cambering of the band-saw blade may be ascertained in the curved running region is as evident in FIG. 1 realised by a beam 30 which in the transition region is arranged from the part cheek 21 to the part cheek 22. In this beam 30 there are arranged a multitude of measuring probes 31 on a line. With the measuring probes it is for example the case of optical proximity measuring probes.

In contrast to all band-saw straightening machines present on the market today the measuring beam 30 with a multidude of measuring probes 31 permits a direct detection of the blade over the whole width instead of the linear detection by way of a single probe. This is time-saving and permits also a quicker correction at the location at which it is required.

In FIG. 2 there is shown the example of a device for measuring and setting the tension of a band-saw blade. The band-saw blade 1 is guided over two deviation stations 2 and 2'. The diameter of the deviation station 2' is here in the region formed with a constant radius with a radius r'. In order to adapt to the length of the band-saw blade the deviation station 2 is displaceably arranged by way of tension means 4. The deviation station 2' in contrast is arranged fixed. The deviation station 2 here is represented as a deviation wheel whilst the deviation station 2' is formed by a multitude of deflection rollers.

The transition region 5 which is shown in detail in the FIG. 1 is here shown simplified. Following this transition region 5 is a device 6 with pressure-changeable pressure rollers 10 whose pressing pressure is controllable depending on the measurement. The corresponding control commands are received by the device 6 from the computer 7. To the computer 7 there are also delivered the measuring data of the measuring probes 31. The computer from the measuring points sets up a curve which is to be compared to a nominal curve. This nominal curve, which may be inputted into the computer 7 or is already present in this and accordingly may be called up, is compared to the actual values and from this there results the control commands for the device 6. A control unit 8 serves for measuring the linearity of the back of the band-saw blade. This may be effected by way of mechanical feeling or by way of an optical beam. The control unit 8 also delivers the measuring data to the computer 7 and this measuring data too is evaluated and serves the control of the device 6. Finally there is yet also present a testing unit 9 which ascertains deviations of the planarity of the band-saw blade. This planarity which in turn may be detected via measuring probes or feeling rollers is conveyed further to the computer 7 and again serves for controlling the device 6 with the pressure rollers. The device 6 may be formed completely conventionally. This may for example be two rollers arranged aligned over one another, whose pressure to one another may be varied.

Also in the device shown according to FIG. 2 it would also be possible to arranged the straight path course displaced with respect to the two deviation stations 2 and 2' by the amount of the so-salled eccentricity E. In the example shown here however the eccentricity E represents the difference of the diameter of the deviation stations 2 and 2'. Basically it would indeed also be possible at both sides to form a transition region 5 in order to convey the level path course into the path course with a constant bending radius. For reasons of cost one would however not have a device of the type shown here since the band-saw blade 1 here is neither subjected to tensile stresses nor other stress sitations to a great extent and also the circumferential speed is only slight.

By way of guiding the band-saw blade according to the method as already described previously there not only arises advantages with its measurement but as just mentioned the band-saw blade is as a whole stressed much less. This leads to great advantages inasmuch as there may be achieved an extremely smooth running and a jump in inconsistency in the band-saw blade is largely avoided whereupon it may be concuded that fracture formations in the band-saw blade may be largely avoided. Accordingly by way of this also the life expectancy of a band-saw blade may be increased when one guides the band-saw blade in a band-saw machine according to the method.

The clothoid arc is a relatively complicated geometric curve. In reality one of course may only approximate it. Practically of course each assymptotically approximating curve course from the circular shape to a straight line distanced therefrom is conceivable. The application of clothoid arcs is known today in particular in the construction of roads and rails. By way of the clothoid arc course the centrifugal forces on transition from the constant circular arc to the straight line are considerably reduced.

What is claimed is:

1. A device for measuring and setting the tension of a band-saw blade, wherein the band-saw blade is guided around two deviation stations arranged at a distance from one another, with which the band-saw blade in each case is guided with a constant radius, and at least one straight-lined path arranged therebetween, wherein there is present at least one transition region from a deviation station with an increasing radius up to the straight-lined path, wherein the band-saw blade in this transition region is guided with an increasing radius at least approximately in the shape of a clothoid arc, wherein the device comprises pressure rollers which depending on the measurement are controllable with respect to change in pressure and are arranged in the straight-lined path, characterized in that the measurement of the stress is effected by way of a measuring station which is arranged in the region in which the band-saw blade in the transition region is guided with an increasing radius of a clothoid arc.

2. A device according to claim 1, wherein the transition region with a clothoid arc shape is formed by two parallel guide cheeks, which in each case are subdivided into two part cheek sections and that the saw blade in this transition region runs between a plurality of contact rollers and holding-down rollers which are mounted in pivoting carriages.

3. A device according to claim 2, wherein the measuring station is arranged at least approximately in the vicinity of the middle of the transition region with a clothoid arc shape.

4. A device according to claim 2, wherein in the straight-lined path in front of the pressure rollers there is arranged a control unit which measures the linearity of the back of the band-saw blade.

5. A device according to claim 2, wherein in the straight-lined path in front of the pressure rollers there is a testing unit which tests the planarity of the band-saw blade.

6. A device according to claim 2, wherein the device comprises a computer which compares the measuring data of the measuring station and/or a control unit and/or a testing unit with nominal values and further comprising control means which control the pressure rollers in accordance with the computer.

7. A device according to claim 6, wherein a camber value for the band-saw blade is input to the computer.

8. A device according to claim 2, wherein the distance between the deviation stations is changeable by way of tension means.

9. A device according to claim 2, wherein the measuring station comprises a beam arranged transversely to the parallel guide cheeks, in which several proximity measuring probes are arranged in a line, by way of which the present cambering of the band-saw blade is measured.

10. A device according to claim 9, wherein a camber value for the band-saw blade is input to the computer.

* * * * *